Patented Jan. 7, 1930

1,742,240

UNITED STATES PATENT OFFICE

MAURICE V. DOUTHITT, OF BIGSTONE CITY, SOUTH DAKOTA

PROCESS OF PREPARING AND CANNING CORN

No Drawing.    Application filed February 20, 1928. Serial No. 255,864.

My invention provides an improved method or process of preparing and canning corn, especially of the whole or full cut type, whereby the natural color and flavor of the corn are maintained and a superior quality of canned corn is produced. The manner in which this improved process has, in practice, been carried out, is as follows:

1. The unhusked ears of corn are placed in boiling water or subjected to steam, either of which actions is herein treated as the equivalent of subjecting the same to a boiling or initial cooking action, and by this first step, the corn is initially or at least partially cooked, not only while it is on the cob, but while it is surrounded by and subject to the juices from the husks. Thus, all of the original juices, starch and sugar are at least partly set within the kernels of corn.

2. The corn ears, with the husks still on, are then placed in or subjected to a vat or spray of cold water, which chills or permanently sets the starches and sugar in the corn kernels.

3. The husks are then removed from the ears, either by hand or by suitable machinery.

4. The corn will next be cut from the cob, either by hand or machinery.

5. The cut corn is then subjected to separating means, such as a shaking screen, the meshes of which will allow the whole kernels of corn to pass therethrough and will not pass therethrough but will carry off the pieces of cob, corn silk and any husks not before removed.

6. The corn, which is then quite cleaned but may contain some particles of corn silk or other light objects, is then put through a flotation process by emersing the corn in water and floating off the light particles.

7. The cans are then filled with the cut corn and the proper amount of syrup is added to give the same the desired sweetness, and the filled cans are subjected to a cooking heat varying from 160° to 200° Fahrenheit, and the cans are then sealed.

8. To complete the cooking of the corn, it is customary to place the closed cans in retorts and to subject the same to cooking heat.

The vital difference between this improved method and older methods or processes is in the manner and order in which the steps 1 to 4, inclusive, are carried out. Usually, the husks are removed from the corn before the initial cooking of the corn is performed and, by this older method, much of the natural flavor of the corn is lost and the color of the corn is changed, but by the improved process above described, substantially all of the natural flavor and the color of the corn are maintained.

The initial cooking with the husks on the cobs has a bleaching effect, which prevents discoloration of the corn, that is, offsets that effect of cooking which tends to darken the corn. The first step above described facilitates the rapidity of the process because it permits the unhusked corn to be dumped directly from wagons into the boiling water or steam receptacle.

What I claim is:

1. The method of cooking and canning corn which consists in subjecting the unhusked corn ears to the initial cooking action of hot water or steam, in subjecting the initially cooked unhusked ears to a chilling bath of water to set the starch and sugar therein, in removing the husks from the ears, in cutting the corn from the cob, and in thereafter completing the cooking and the canning of the corn thus treated.

2. The method of cooking and canning corn which consists in subjecting the unhusked corn ears to the initial cooking action of hot water or steam, in subjecting the initially cooked unhusked ears to a chilling bath of water to set the starch and sugar therein, in removing the husks from the ears, in cutting the corn from the cob, in separating the corn kernels from the corn silk and other foreign particles, and in thereafter placing the corn in cans and completing the cooking thereof.

3. The method of cooking and canning corn which consists in subjecting the unhusked corn ears to the initial cooking action of hot water or steam, in subjecting the initially cooked unhusked ears to a chilling bath of water to set the starch and sugar therein, in removing the husks from the ears, in cutting the corn from the cob, in subjecting the corn to a screening action to remove therefrom corn silk, in removing husks and other light foreign particles, in then subjecting the corn to a flotation process to further remove foreign particles, in placing the corn in cans and heating the same, in sealing the cans, and in finally completing the heating of the corn by subjecting the sealed cans to cooking retorts.

In testimony whereof I affix my signature.

MAURICE V. DOUTHITT.